B. Hotchkiss,
Steam-Engine Valve-Gear.
Nº 23,685. Patented Apr. 19, 1859.

Witnesses;
S. Thompson
R. Fitzgerald

Inventor;
Benel Hotchkiss

UNITED STATES PATENT OFFICE.

BENNET HOTCHKISS, OF NEW HAVEN, CONNECTICUT.

VARIABLE CUT-OFF GEAR FOR STEAM-ENGINES.

Specification of Letters Patent No. 23,685, dated April 19, 1859.

*To all whom it may concern:*

Be it known that I, BENNET HOTCHKISS, of the city and county of New Haven, in the State of Connecticut, have invented a new and useful Improvement in Cut-Offs for Steam-Engines; and I do hereby declare that the following is a full, clear, and exact description of the construction, character, and operation of the same, reference being had to the accompanying drawings, which make a part of this specification, in which—

Figure 1:
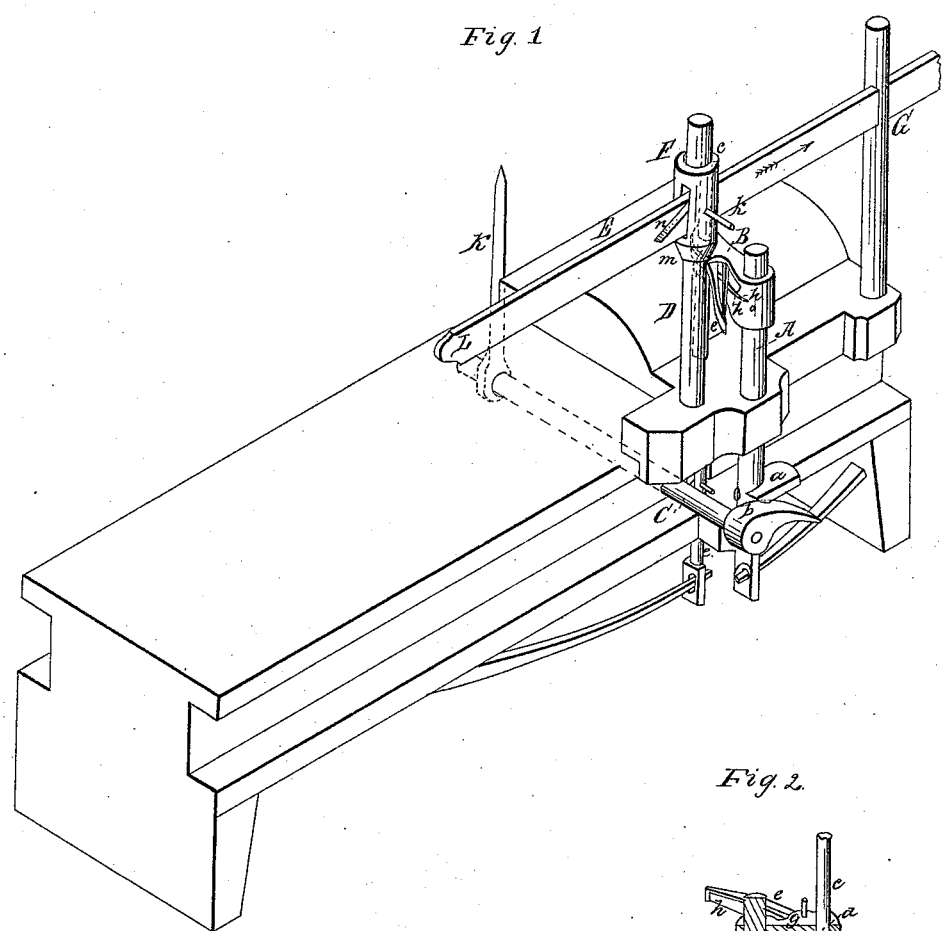
Figure 2:
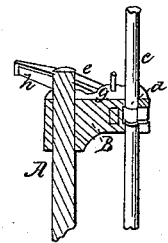

Figure 1 is a perspective view of the cut-off apparatus, showing the manner of tripping the valve, etc. Fig. 2 is a section of the rod and arm which lift the rod, or stem, of the valve, showing their connection with the tripping lever.

My improvement consists in the method of tripping the valve stem by the use of an inclined plane on the end of a collar which is adjusted by the operation of the governor on a sliding bar, by means of a diagonal slot, in such a manner that the admission of the steam into the cylinder will be cut off at any desired portion of the stroke of the piston, exactly in accordance with the velocity of the governor.

I make the rod, A, and arm, B, (to raise the valve stem,) of iron, or any other suitable material, substantially, as shown in Fig. 1, and, on the lower end of the rod, A, I fix a foot, or projecting piece, as shown at *a*, which enables the cam-shaped toe, *b*, on the rock-shaft, C, to raise the rod, and with it the arm, B, which is connected with the valve stem, *c*, as shown in Fig. 2, and indicated by dots at *c*, Fig. 1.

In the upper portion of the valve stem, *c*, I make a recess, as shown at *d*, Fig. 2, (where the stem moves freely in arm, B,) and, to the arm, B, I attach a lever, *e*, Figs. 1, and 2, which works on a joint pin, or fulcrum, at *g*. The inner end of this lever, *e*, is pressed into the recess, *d*, in the valve stem, *c*, as shown in section in Fig. 2, by the action of a spring, as seen at *h*, Figs. 1, and 2, (substantially as in F. E. Sickles's patent.) To trip this valve stem, *c*, I erect a standard, D, Fig. 1, through which I cut, or make, two mortises, at right angles with each other, through one of which the sliding bar, E, passes, as shown in Fig. 1, and through the other, the pin, *k*, works, to elevate, or depress, the collar, F.

I make the collar, F, Fig. 1, as a hollow cylinder to move freely on the standard, D, with a mortise through it to admit the bar, E, to pass to elevate, or depress it, (by means of the pin, *k*,) and at its lower end, I form an inclined plane, as shown at *m*, Fig. 1, to act upon the lever, *e*, to trip the valve, and cut off the steam, at the proper time.

I make the flat, or sliding bar, E, Fig. 1, with an inclined, or diagonal, mortise, or slot, as shown at *n*, Fig. 1, through which the pin, *k*, passes to sustain the collar, F, in the required position;—and, as the pin, *k*, works in the mortise in the standard, D, (as before described,) when the bar, E, is moved in the direction indicated by the dart, the collar, F, will be depressed in proportion to the place the pin, *k*, occupies in the inclined slot, or mortise, *n*. To cause this bar, E, to move freely, and steadily, I erect another standard, at G, through the mortise in which one end of the bar passes, as shown in Fig. 1.

To work the valve gear, I use a common rock-shaft, as shown at C, Fig. 1, worked in the usual way, as by the lever K, or by any other means found to be convenient.

I use the common governor, or any other similar regulator.

To use my improvement, I connect the governor with the end, L, of the sliding bar, E, adjust the whole to the speed and power required, and set the engine in motion in the usual way. Then, when the balls of the governor expand, by the increased velocity, they will move the bar, E, in the direction indicated by the dart, which will cause the inclined slot, *n*, to act upon the pin, *k*, and force down the collar, F, so that the lever, *e*, will come in contact with the inclined plane, *m*, at a less height, and the valve will be tripped, and the steam shut off, at a less portion of the stroke of the piston, so as to regulate the induction of the steam to the quantity required to produce the necessary power. Thus, it will require no attention from the engineer, however frequently the belts may be thrown off, or how much the heat varies, while there is enough steam generated to afford the greatest power needed for the machinery.

The advantages of my improvement consist in the simplicity of the means used to render it self regulating. And in the exactness of the regulation of its movements by its own power, so as to save a great amount of expense in constructing and working, as well as in the saving of fuel.

I am aware that the valve has been tripped, so as to cut off the steam at any definite portion of the stroke of the piston, by an adjustable inclined plane and lever, when the inclined plane was adjusted and fixed by hand, as in the patent of F. E. Sickles. I therefore do not claim the use of the inclined plane and lever to trip the valve, as such, as my invention; but

What I claim as my invention, and desire to secure by Letters Patent, is—

The combination of the sliding bar, E, with the sliding collar, F, when constructed, arranged, and made to control the time of the cut-off, by the operation of the governor, or regulator only, substantially as herein described.

BENNET HOTCHKISS.

Witnesses:
S. THOMPSON,
R. FITZGERALD.